(12) United States Patent
Taniguchi et al.

(10) Patent No.: US 7,787,155 B2
(45) Date of Patent: Aug. 31, 2010

(54) COMMUNICATIONS DEVICE AND COMMUNICATIONS METHOD

(75) Inventors: Tsutomu Taniguchi, Nara (JP); Makoto Nakabayashi, Nara (JP); Takeshi Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1845 days.

(21) Appl. No.: 10/719,955

(22) Filed: Nov. 21, 2003

(65) Prior Publication Data

US 2004/0105121 A1 Jun. 3, 2004

(30) Foreign Application Priority Data

Nov. 25, 2002 (JP) ............... 2002-341554

(51) Int. Cl.
*H04N 1/00* (2006.01)
*H04N 1/41* (2006.01)
*G06K 15/00* (2006.01)
*G06F 3/14* (2006.01)
*G06F 3/12* (2006.01)
*G06K 15/02* (2006.01)

(52) U.S. Cl. ............... 358/426.05; 358/1.16; 358/1.13; 358/407; 358/404; 358/406; 358/403; 358/426.02; 358/1.15; 358/426.06

(58) Field of Classification Search ............ None
See application file for complete search history.

(56) References Cited

U.S. PATENT DOCUMENTS 5,245,368 A * 9/1993 Farrell et al. ............... 358/401
5,327,526 A * 7/1994 Nomura et al. ............ 358/1.16
5,377,354 A * 12/1994 Scannell et al. ............ 718/103
5,513,126 A * 4/1996 Harkins et al. ............ 709/228

(Continued)

FOREIGN PATENT DOCUMENTS

CN 1237065 12/1999

(Continued)

OTHER PUBLICATIONS

Fajman, Roger. Request for Comments 2298 "An Extensible Message Format for Message Disposition Notifications" [online]. The Internet Engineering Internet Task Force. Mar. 1998 [retrieved on Dec. 3, 2008]. Retrieved from the Internet: <URL:www.ietf.org/rfc/rfc2298.txt>.*

(Continued)

*Primary Examiner*—Twyler L Haskins
*Assistant Examiner*—Myles D Robinson
(74) *Attorney, Agent, or Firm*—David G. Conlin; Steven M. Jensen; Edwards Angell Palmer & Dodge LLP (57) ABSTRACT

In a communications device, a terminal machine transmits/receives data over a network and makes a request for a response to a data transmission from a receiving-end machine. In the terminal machine, an e-mail message identifying unit determines whether data to be received over the network is response data to the response request, and a main control unit controls so as to preferentially receive data identified as the response data by the e-mail message identifying unit over other data. Thus, if an e-mail message is transmitted with a request for a disposition verification, a reply message to the disposition verification request can be quickly received from the receiving-end machine.

7 Claims, 9 Drawing Sheets

U.S. PATENT DOCUMENTS

| | | | |
|---|---|---|---|
| 5,689,642 A * | 11/1997 | Harkins et al. | 709/207 |
| 5,764,899 A * | 6/1998 | Eggleston et al. | 709/203 |
| 6,067,107 A | 5/2000 | Travaille et al. | |
| 6,189,027 B1 * | 2/2001 | Haneda et al. | 709/206 |
| 6,351,764 B1 * | 2/2002 | Voticky et al. | 709/207 |
| 6,437,873 B1 * | 8/2002 | Maeda | 358/1.15 |
| 6,650,440 B1 * | 11/2003 | Wing | 358/402 |
| 7,180,637 B2 * | 2/2007 | Tanimoto | 358/402 |
| 7,185,108 B1 * | 2/2007 | Okachi | 709/240 |
| 7,254,641 B2 * | 8/2007 | Broughton et al. | 709/240 |
| 2001/0005268 A1 * | 6/2001 | Eguchi | 358/1.9 |
| 2002/0054336 A1 * | 5/2002 | Yamaguchi | 358/1.15 |
| 2003/0163574 A1 * | 8/2003 | Tohki et al. | 709/228 |
| 2003/0164990 A1 * | 9/2003 | Watanabe | 358/402 |
| 2003/0187937 A1 * | 10/2003 | Yao et al. | 709/206 |
| 2003/0233421 A1 * | 12/2003 | Shibata et al. | 709/206 |
| 2008/0270540 A1 * | 10/2008 | Larsen | 709/206 |

FOREIGN PATENT DOCUMENTS

| | | |
|---|---|---|
| JP | 08-263408 | 10/1996 |
| JP | 10-021164 | 1/1998 |
| JP | 11-039235 | 2/1999 |
| JP | 2000-112842 | 4/2000 |
| JP | 2001-265675 | 9/2001 |
| JP | 2001-274944 | 10/2001 |
| JP | 2001-309109 | 11/2001 |
| JP | 2001-337900 | 12/2001 |
| JP | 2002-032318 | 1/2002 |
| JP | 2002-318769 | 10/2002 |

OTHER PUBLICATIONS

U.S. Appl. No. 10/456,250, filed Jun. 5, 2003, Shibata et al.
U.S. Appl. No. 10/438,495, filed May 14, 2003, Shibata et al.

* cited by examiner

(a) HEADER
Date: 20 Jun 2002 09:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN] ← Disposition-Notification-To: Sharp_Doc_InternetFAX@sharp.co.jp ← [RETURN ADDRESS FOR MDN]

MIME-Version: 1.0
Content-Type: multipart/mixed; boundary="SHARP-SmTP-BOUNDARY-A30"
Content-Transfer-Encoding: 7bit
Message-ID: <111@SHARP_D1>

(b) TEXT
--SHARP-SmTP-BOUNDARY-A30
Content-Type: text/plain; charset=iso-2022-jp
Content-Transfer-Encoding: 7bit DEVICE NAME : SHARP_D1
MODEL NAME : SHARP AR-M450
LOCATION :
FILE FORMAT : TIFF (MMR)
RESOLUTION : 200dpi x 200dpi
ATTACHMENT IS SCANNED TIFF IMAGE (c) ATTACHMENT
--SHARP-SmTP-BOUNDARY-A30
Content-Type: image/tiff;
name="SHARP_D1_InternetFAX_2002001.tif"
Content-Transfer-Encoding: base64
Content-Disposition: attachment;
filename="SHARP_D1_InternetFAX_2002001.tif"

SUkqAAgAAAARAP4ABAABAAAAgAAAAABBAABAAAAwAYAAAEBBAABAAAAJwkAAAIBAwA
AAMBAwABAAAAAwAAAAYBAwABAAAAoBAwABAAAAgAAABEBBAABAAAACgEAAB

MAIL SERVER
(MANAGING TABLE)

| MESSAGE NO. | ID | MAIL SIZE (TEXT + ATTACHMENT) |
|---|---|---|
| 1 | AAAAAA | 50K |
| 2 | BBBBBB | 2K |
| 3 | CCCCC | 60K |
| 4 | DDDDD | 2K |
| 5 | EEEEE | 50K |
| | | |

FIG. 7

RECEIVING MACHINE (TERMINAL MACHINE)
(MANAGING TABLE)

| MESSAGE NO. | ID | MAIL SIZE (TEXT + ATTACHMENT) | RECEIPT ORDER |
|---|---|---|---|
| 1 | AAAAAA | 50K | 3 |
| 2 | BBBBBB | 2K | 1 |
| 3 | CCCCC | 60K | 4 |
| 4 | DDDDD | 2K | 2 |
| 5 | EEEEE | 50K | 5 |
| | | | |

COMMUNICATIONS DEVICE AND COMMUNICATIONS METHOD

FIELD OF THE INVENTION

The present invention relates to a communications device which transmits image information and other data over a network, and in particular to a communications device with functions to transmit data with predetermined transmission settings and to request and verify a response from a destination.

BACKGROUND OF THE INVENTION

Recent development of networking has created new applications for network communications devices which transmit/receive e-mail messages over the Internet or like network.

Some newly developed network communications devices can not only capture an image with a built-in scanner function, but also forward the captured image information to a computer or like apparatus connected to the network in the form of an attachment to an e-mail message.

Other network communications devices having the same arrangement have also been developed: for example, network scanners (network communications devices) with a "scan to e-mail" function. The function scans an original image for format data to create an e-mail attachment and sends the attachment to an e-mail message to an address (host computer) on the Internet.

Network facsimile machines have been developed too which incorporate a built-in print function and telephone function in addition to the scanner function.

Figure 10:
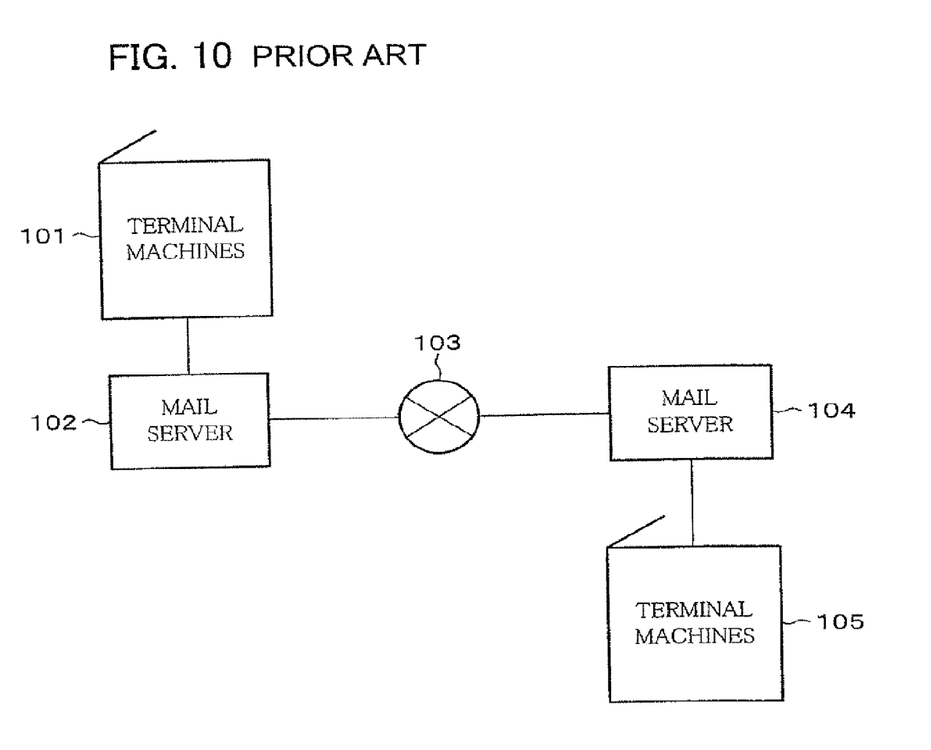
FIG. 10 is a block diagram illustrating an arrangement of a network communications system including multiple terminal machines, as conventional communications devices, which transmit/receive e-mail messages among them.

Such a network facsimile machine is disclosed in, for example, Japanese Published Unexamined Patent Application 2001-274944 (Tokukai 2001-274944; published on Oct. 5, 2001). FIG. 10 is a schematic showing an arrangement of a network communications system with such a network facsimile machine.

As shown in the figure, in the network communications system, an e-mail message sent from a transmitting-end terminal machine (network facsimile machine) 101 to a transmitting-end mail server machine 102 is transferred to a receiving-end mail server machine 104 over a network 103 using a predetermined mail transfer protocol such as SMTP (Simple Mail Transfer Protocol). The e-mail message is then stored in the mail server machine 104. A receiving-end terminal machine (network facsimile machine) 105 periodically accesses the receiving-end mail server machine 104 using POP3 (Post Office Protocol 3), IMAP (Internet Message Access Protocol), or another mail receive protocol to retrieve the e-mail message stored there.

Further, the network communications system is adapted to delete the e-mail message received by the terminal machine 105 from the mail server machine 104 so that the e-mail message is not repeatedly transferred after the receiving-end terminal machine 105 receives the e-mail message and prints out the attached image information as a received document.

A problem occurs under these circumstances where information is transmitted using an e-mail message as in the foregoing: unlike, for example, those cases when information is transmitted by an ordinary facsimile machine, the transmitting-end of the network communications system has no means to determine whether the information has been received successfully or processed properly by the receiving-end.

Specifically, unlike ordinary facsimile machines performing real time communications with each other over a PSTN (Public Switched Telephone Network), the receiving-end terminal machine 105 of the network communications system is not always connected to the mail server machine 104, and the transmitting-end terminal machine 101 can forward a message to the mail server machine 102 anytime no matter whether the receiving-end terminal machine 105 can receive it at that time; therefore, the receiving-end terminal machine 105 may take time to actually receive the message. In the event, the transmitting-end terminal machine 101 cannot determine immediately after transmission whether the message has been received successfully or processed properly by the receiving-end terminal machine 105.

Therefore, in conventional network communications systems, when there is a need to verify safe delivery of the transmitted information, the operator must inconveniently confirm it by telephone. It is also a problem that e-mail communications loses an advantage over telephone communications that the parties involved do not need to talk to each other in real time.

Accordingly, another conventional method addressing these shortcomings is defined in the MDN (Message Disposition Notification) method in RFC 2298 which provides a means of confirming safe delivery of an e-mail message whereby upon reception of an e-mail message, the receiving-end terminal machine sends a confirmation message back to the transmitting-end terminal machine.

"RFCs" (Requests For Comments) are official documents issued by the IETF (Internet Engineering Task Force), an Internet-related technology standards body. The documents define, for example, specifications and requirements of Internet protocols, such as IP (Internet Protocol), TCP (Transmission Control Protocol), HTTP (HyperText Transfer Protocol), and FTP (File Transfer Protocol), and various Internet-related technologies. They are numbered throughout like "RFC 2298" and publicly available.

The MDN gives a new "Disposition-Notification-To" field in the header of e-mail messages. The disposition is verified using this field provided that the transmitting-end and receiving-end terminal machines meet the MDN specifications. Specifically, the transmitting end specifies an address in the field to which a disposition verification message should be directed before transmitting the message, and the receiving end sends a disposition verification message to the address specified in the field. The immediately following prior art technology utilizes the MDN function to quickly and reliably deliver an e-mail message to the destination.

Japanese Published Unexamined Patent Application 2001-309109 (Tokukai 2001-309109; published on Nov. 2, 2001) discloses an arrangement of a machine equipped with the MDN function where if the transmitting end sends an MDN request, but does not receive a return message by e-mail from receiving-end within a certain period of time after the completion of the transmission, a disposition failure notice is printed out to notify the operator that no message is sent back. The operator at the transmitting-end terminal machine can thereby confirm whether the message has been successfully transmitted to the receiving-end terminal machine, and retransmit the message or perform another process without delay.

Japanese Published Unexamined Patent Application 2002-32318 (Tokukai 2002-32318; published on Jan. 31, 2002) discloses a communications terminal machine adapted to determine whether an incoming e-mail message includes a disposition verification request and if it does, transmit a disposition verification in the same call as the incoming e-mail message. The arrangement can send a response without delay and at a minimal communications cost.

When the terminal machine receives e-mail messages stored in a mail server machine, it does so in the same order as the mail server machine stores/receives the messages, i.e., by the message numbers. If the terminal machine cannot receive all the messages addressed to that terminal machine in a single connection to the mail server machine due to memory capacity constraints of the terminal machine, the terminal will receive the remaining messages in a next connection.

Therefore, even if the receiving-end terminal machine sends a reply message indicating disposition verification of an e-mail message as quickly as possible, and the mail server machine receives the reply message before a timeout, the transmitting-end terminal machine (the terminal machine which made an MDN request in the first place) may fail to receive the reply message due to its memory capacity constraints, resulting in a timeout error.

In addition, if the MDN indicates a failed delivery, there is usually a need to give priority to receipt of a reply message to MDN over that of ordinary e-mail messages for quick implementation of a retransmission of the e-mail message or another process.

SUMMARY OF THE INVENTION

To address these problems, the present invention has an objective of providing a communications device and method which, when an e-mail message is transmitted together with a disposition verification request, quickly receives a reply message to the disposition verification request from a receiving-end machine and prevents a timeout error from occurring while waiting for the disposition verification.

To achieve the objective, a communications device in accordance with the present invention is a communications device transmitting/receiving data, such as an e-mail message, over a network, such as the Internet, and making a request for a response to a data transmission from a receiving-end machine, and is characterized in that it includes: a data identifying unit for determining whether data to be received over the network is response data to the response request; and a receipt control unit for controlling receipt so as to preferentially receive data identified as the response data by the data identifying means over other data.

A communications device in accordance with the present invention is characterized in that it includes: a transmission receipt unit for transmitting/receiving data, such as an e-mail message, over a network, such as the Internet; a response request embedding unit for embedding a response request for a response to a data transmission from a receiving-end machine in transmitted data; a data identifying unit for determining whether data to be received over the network is response data to the response request; and a receipt control unit for controlling the transmission/receipt unit so as to preferentially receive data identified as the response data by the data identifying unit over other data.

A communications method in accordance with the present invention is a communications method of transmitting/receiving data, such as an e-mail message, over a network, such as the Internet, and making a request for a response to a data transmission from a receiving-end machine, and is characterized in that it includes the steps of: determining whether data to be received over the network is response data to the response request; and preferentially receiving data identified as the response data over other data.

According to the arrangement, if not always connected to, for example, a network, the communications device transmits, to a receiving-end machine, data containing a response request (disposition verification request (MDN (Message Disposition Notification) request)) to a data (e-mail message) transmission via a network, such as the Internet. Under these circumstances, the communications device reconnects to the network later to receive incoming data (e-mail messages) over the network. In so doing, the communications device (data identifying unit) determines whether the data is response data to the response request.

If the data contains data identified as the response data (a reply message to the MDN request), the communications device (receipt control unit) preferentially receives the thus-identified data over other data.

Therefore, if a request has been made for a response to a data transmission from a receiving-end machine, the communications device is capable of quickly receiving response data to the response request from the receiving-end machine and preventing a timeout error from occurring while waiting for response data (disposition verification).

To receive e-mail messages stored in a mail server machine, for example, a terminal machine receiving e-mail messages via the mail server machine usually do so in the same order as the mail server machine stored/received the messages, i.e., by the message numbers. If any e-mail messages cannot be received due to empty space constraints of the terminal machine's memory in the current connection, they will be received when the terminal machine connects to the mail server machine next time. Therefore, even if the receiving-end machine sends a reply message as quickly as possible, and the mail server machine receives the reply message before a timeout, the terminal machine (machine which made an MDN request) may fail to receive the reply message due to its memory empty space constraints, resulting in a timeout error. The arrangement of the present invention solves these problems as mentioned earlier.

A communications device in accordance with the present invention is a communications device transmitting/receiving data over a network and making a request for a response to a data transmission from a receiving-end machine, and is characterized in that it includes: a data identifying unit for determining whether data to be received over the network is response data to the response request; and a receipt control unit for ranking, concerning receiving of data, data identified as the response data by the data identifying unit higher than other data.

According to the arrangement, if the data identifying unit determines that the data to be received over the network is response data to the response request, the data is ranked higher in receipt than other data. Therefore, the response data to the response request is preferentially received over other data.

Specifically, for example, the e-mail messages stored in the mail server machine are assigned message numbers. The e-mail message determined to be a reply message to a response request is ranked higher in receiving than non-reply messages, no matter what the message number. The communications device makes a receive request to the mail server machine on the basis of the resultant ranking.

Therefore, similarly to the aforementioned arrangement, when a request is made for a response to a data transmission from the receiving-end machine, the response data to the response request is quickly received from the receiving-end machine. The timeout error is prevented from occurring while waiting for response data (disposition verification).

The communications device may be arranged so that the communications device transmits/receives data through a network and a relay device, such as a mail server machine, the relay device receiving and storing data addressed to the communications device over the network and for assigning identity information and a serial number to each of stored data sets, the stored data sets being renumbered where necessary so that they are serially numbered; and when data is to be received from the relay device, the receipt control means changes a data receiving ranking by way of a request to the relay device from a ranking indicated by the serial numbers.

According to the arrangement, the relay device, such as mail server machine, assigns to, each received and stored data set (e-mail message) addressed to the communications device, unique identity information, for example, unique IDs which may be any given character strings 70 or less letters long, and a serial number, such as, a serial message number starting from 1. Every time any of the data sets is deleted, the remaining data sets are serially renumbered.

The identity information on the other hand is unique to a data set (e-mail message) and does not alter. The identity information, for example, unique IDs, of all e-mail messages stored in, for example, a mail server machine as the relay device is transmitted altogether to a communications device in a single connection of the communications device to the mail server machine.

Accordingly, altering the data receiving order by way of a request to the relay device from the one as indicated by the serial numbers so as to change the receiving ranking before receiving data from the relay device enables the response data to a response request to be preferentially received over other data.

The communications device may be arranged so that the data identifying means determines whether data to be received is the response data by comparing a size of the data to be received to a predetermined data size.

In the arrangement, a response data to a response request (MDN request) does not have an attachment and is comparatively small in data size than data with an attachment. Therefore, specifying a threshold value for the predetermined data size in advance for identifying response data enables comparison to a received data size and identification of response data. The arrangement simply and readily identifies response data.

The communications device may be arranged to further include storage means for storing received data; and storage control means for controlling storing to the storage means so that after storing the received data, the storage means is left with empty space needed to store the response data.

According to the arrangement, if not always connected to, for example, a network, the communications device transmits, to a receiving-end machine, data containing a response request (MDN request) to a data (e-mail message) transmission via a network. Thereafter, the communications device reconnects to the network to receive incoming data (e-mail messages) over the network. In so doing, the storage control means ensures that the storage means has empty space needed to store response data. Therefore, the response data can be reliably received. A situation is prevented where the response data cannot be received due to the storage means's capacity shortage. No timeout error occurs while waiting for response data (disposition verification).

The communications device may be arranged so that the receipt control means ranks the data if the request for a response to a data transmission from a receiving-end machine is made.

According to the arrangement, the receipt control means ranks the data when only a request has been made for a response to a data transmission from the receiving-end machine. Therefore, in an ordinary process where no response is requested, operation is simplified.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

Embodiment 1

The following will describe an embodiment of the present invention in reference to drawings.

Figure 2:
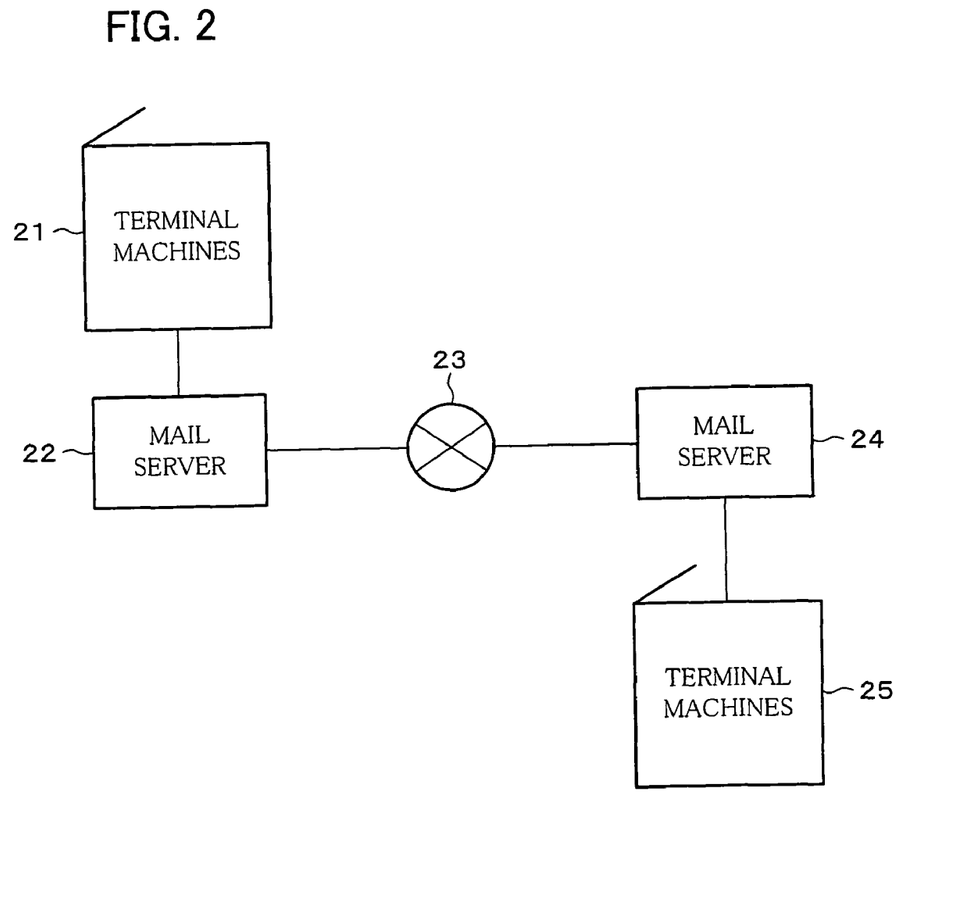
FIG. 2 is a block diagram illustrating an arrangement of a network communications system including multiple terminal machines shown in FIG. 1 which transmit/receive e-mail messages among them.

Referring to FIG. 2 among others, a network communications system is arranged from, for example, terminal machines (communications devices) 21, 25 which are each built around a network facsimile machine equipped with an Internet communications function, mail server machines (relay devices) 22, 24, and a network 23 such as the Internet. Although the figure shows only one transmitting-end terminal machine 21 and one receiving-end terminal machine 25, multiple transmitting-end terminal machines 21 and multiple receiving-end terminal machine 25 may be connected to the network 23.

In the figure, an e-mail message sent from the transmitting-end terminal machine 21 to the transmitting-end mail server machine 22 is transferred to the receiving-end mail server machine 24 over the network 23 using a predetermined mail transfer protocol such as SMTP (Simple Mail Transfer Protocol). The e-mail message is then stored in the mail server machine 24. The receiving-end terminal machine 25 accesses the receiving-end mail server machine 24 using POP3 (Post Office Protocol 3), IMAP (Internet Message Access Protocol), or another mail receive protocol to retrieve the e-mail messages stored there.

The network communications system is adapted to delete the e-mail message received by the terminal machine 25 from the mail server machine 24 so that the e-mail message is not repeatedly transferred after the receiving-end terminal machine 25 receives the e-mail message and prints out the attached image information as a received document.

Figure 1:
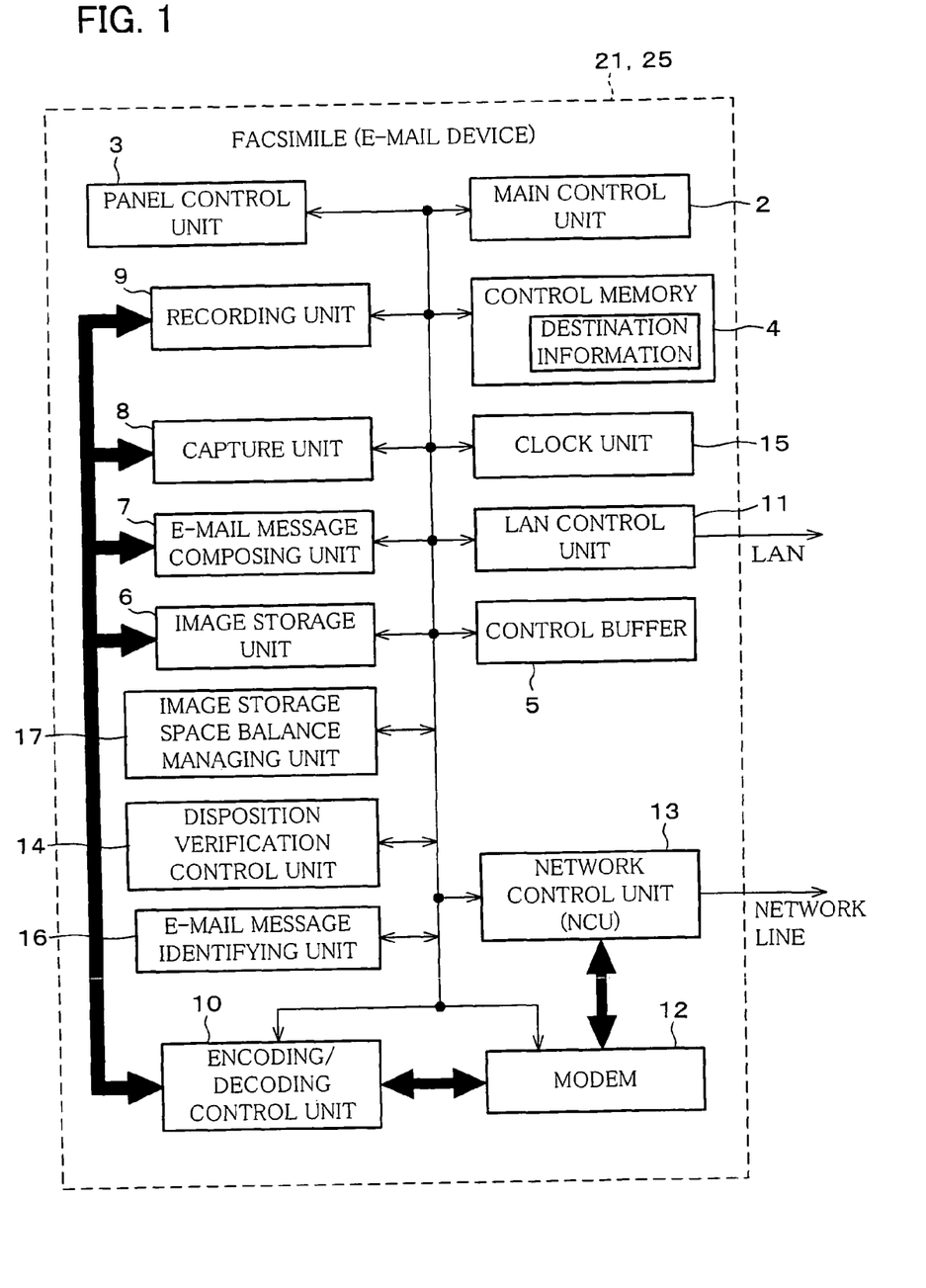
FIG. 1 is a block diagram illustrating an arrangement of a terminal machine as a communications device in accordance with an embodiment of the present invention.

The terminal machines 21, 25 each built around a network facsimile machine may be, for example, the facsimile/e-mail message machine shown in FIG. 1. The figure is a block diagram illustrating an electrical arrangement of the facsimile/e-mail message machine.

The terminal machines, or facsimile/e-mail message machines, 21, 25 have functions as Internet facsimile machines and e-mail message (e-mail/FTP (File Transfer Protocol)) machines transmitting/receiving e-mail messages (e-mail) and transmitting/receiving files with a server machine over a network such as the Internet, as well as functions as printer/copying machines printing data on a recording medium and ordinary facsimile machines for use with a telephone line. Their function as an Internet facsimile machine will be detailed later.

Each terminal machine 21, 25 in essence includes a main control unit (receipt control means) 2, a panel control unit 3, a control memory 4, a control buffer 5, an image storage unit (storage means) 6, an e-mail message composing unit 7, a capture unit 8, a recording unit 9, an encoding/decoding control unit 10, a LAN (Local Area Network) control unit (transmission/receipt means) 11, a modem 12, a network control unit (NCU) 13, a disposition verification control unit (response request embedding means) 14, a clock unit 15, an e-mail message identifying unit (data identifying means) 16, and an image storage space balance managing unit 17.

The main control unit 2 is arranged from, for example, a CPU (Central Processing Unit) and controls the entire terminal machine 21, 25.

The panel control unit 3 is provided to enter, for example, an original image capture command and the recipient's information. Details will be given later.

The control memory 4 is composed of an involatile memory such as a ROM or a volatile memory with a back up, and stores various control programs and the recipient's information (the destination's telephone number, short digit number, etc.).

The control buffer 5 is composed of, for example, a RAM and stores necessary data to execute the control programs.

The image storage unit 6 stores, for example, encoded image data, data captured by the capture unit 8 (detailed later), incoming data, and decoded data.

The e-mail message composing unit 7 adds header information to image data encoded in the encoding/decoding control unit 10 and converts to e-mail message format.

The capture unit 8 is a scanner based on charge coupled devices (CCDs) as original capture means and captures an original at a predetermined resolution. The unit outputs dot image data of the captured original.

The recording unit 9 is equipped with, for example, an electrophotographic printer machine and prints out an image of the original received through communications, an image of the original captured by the capture unit 8, and other data.

The encoding/decoding control unit 10 encodes the captured image data of the original and decodes received image data of the original. In other words, the encoding/decoding control unit 10 encodes/compresses the image data of the original captured by the capture unit 8 and decodes the incoming encoded/compressed image data of the original back to the original data. With the encoding/decoding control unit 10 can be employed encoding schemes commonly used in facsimile communications, such as MH (Modified Huffman), MR (Modified READ), and MMR (Modified Modified READ).

The LAN control unit 11 acts to connect to the LAN (Local Area Network) for e-mail message transmission/receipt and facsimile communications over the Internet.

The modem 12 provides a means of performing ordinary facsimile communications and is made up of a facsimile modem capable of facsimile communications. The modem 12 is connected to a public telephone line via the network control unit 13.

The network control unit 13 is hardware implementing line control operation of connecting and disconnecting to an analog public switched telephone network (PSTN) and connects the modem 12 to the public switched telephone network where necessary.

The disposition verification control unit 14, for example, makes a request for a disposition verification response based on the MDN (Message Disposition Notification) function ("REQUEST FOR MDN" in FIG. 3) and manages incoming disposition verification responses. The unit 14 controls by means of header information added by the e-mail message composing unit 7.

The clock unit 15 provides an means of measuring an elapsed time from the transmission of a disposition verification request to the receipt of the disposition verification response, and counts, for example, a timeout time (detailed later).

The e-mail message identifying unit 16 determines whether the data stored in the mail server machine 21, 25 is an e-mail message response to the request for a disposition verification response by means of the MDN function. The unit 16 identifies such data by comparing the received data size and a predetermined data size $\alpha$.

The image storage space balance managing unit 17 manages the image storage unit 6 storing received data, so as to always secure a space necessary to receive an e-mail response message to a request for a disposition verification response by means of the MDN function when the terminal machine 21, 25 receives the data stored in the mail server machine 21, 25.

The following will describe functions of the terminal machines 21, 25 as Internet facsimile machines.

The transmitting-end terminal machine 21 performs the next process when transmitting facsimile document data (image data) by means of its functions as an Internet facsimile machine. An example of the message structure of an e-mail message transmitted here is shown in FIG. 3.

First, the facsimile document data to be transmitted is encoded by the encoding/decoding control unit 10. The facsimile document data is converted into a TIFF (Tagged Image Life Format) file format by the e-mail message composing unit 7, and then converted into an e-mail message format by adding header information ("(a) HEADER" in FIG. 3).

Figure 3:
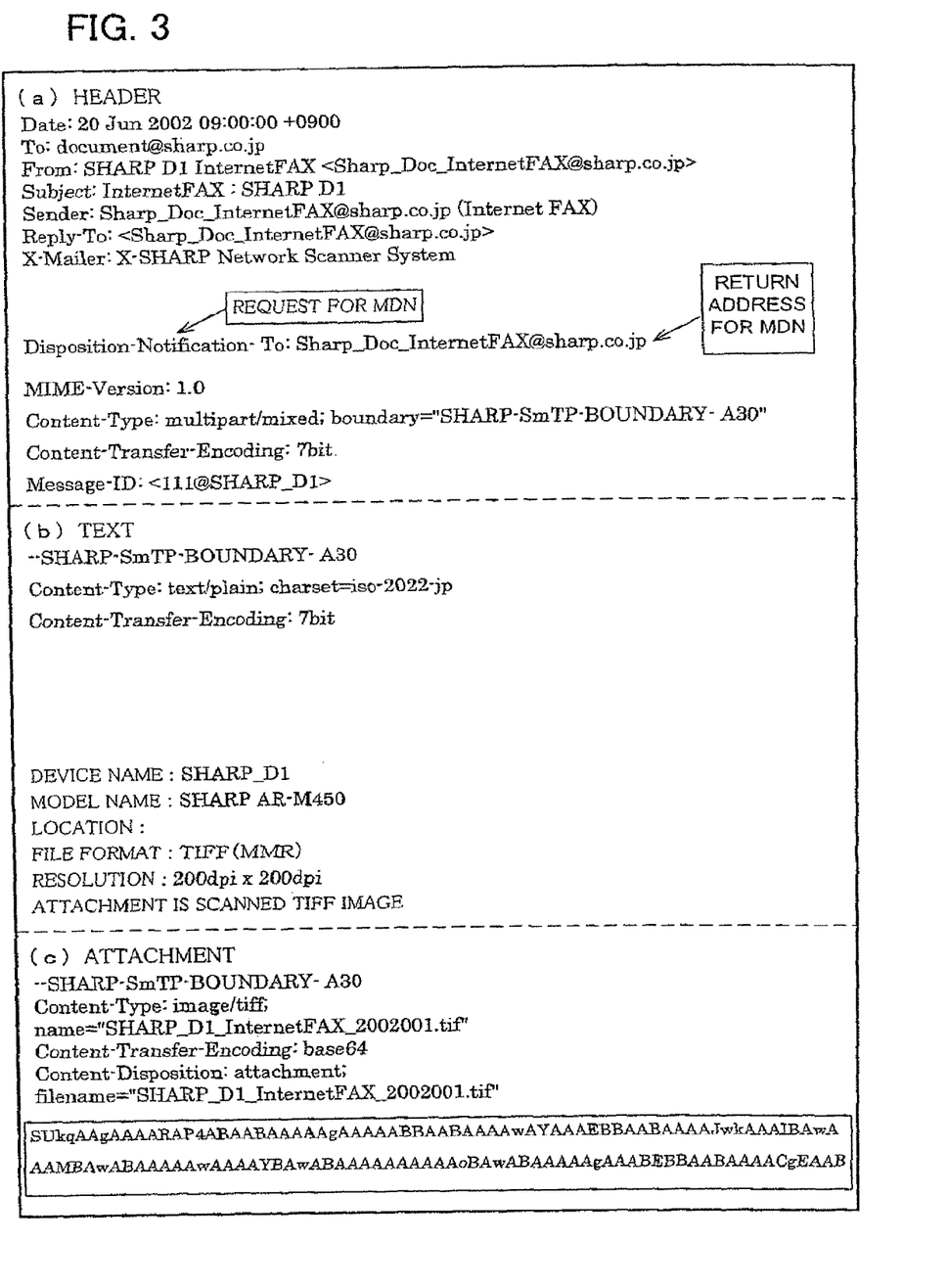
FIG. 3 is an explanatory drawing showing a structure of an e-mail message transmitted/received by the terminal machine in FIG. 1.

In other words, the transmitting-end terminal machine 21 composes an e-mail message by adding facsimile document data (or "(b) Text" in FIG. 3) to the e-mail address indicating a destination for the facsimile document data. The transmitting-end terminal machine 21 then connects to the network (Internet) 23 either directly or by connecting to the mail server machine (host) 22 of the Internet service provider over, for example, public telephone lines, to transfer the e-mail message to the receiving-end mail server machine 24.

The transmission/receipt of an e-mail message becomes possible when the transmitting-end terminal machine 21 and the receiving-end terminal machine 25 both connect to the network 23.

The terminal machines 21, 25 have the MDN function of notifying of the state of processing via e-mail after successful delivery. As mentioned previously, the MDN function verifies a disposition by the receiving-end terminal machine 21 returning a disposition verification response to the transmitting-end terminal machine 25 when an e-mail message is received.

Accordingly, in the terminal machine 21, as shown in FIG. 3, the e-mail message composing unit 7 adds to the e-mail message header an MDN field for use by the disposition verification control unit 14, writes in the MDN field the return address (the e-mail address or number of the transmitting-end terminal machine 21) to which a verification message is sent, in order to make a disposition verification response request.

Now, a preferential reply message receipt function of the terminal machines 21, 25 will be described. Owing to the function, the transmitting-end terminal machine 21, not always connected to the mail server machine 22, connects to the mail server machine 22, and transmits an e-mail message with a request for a disposition verification response to the receiving-end terminal machine 25. When connecting to the mail server machine 22 again, the transmitting-end terminal machine 21 identifies an e-mail response message sent in response to a request for a disposition verification response among the e-mail messages addressed to the terminal machine 21 which are stored in the mail server machine 22 so as to preferentially receive the e-mail response message.

Figure 4:
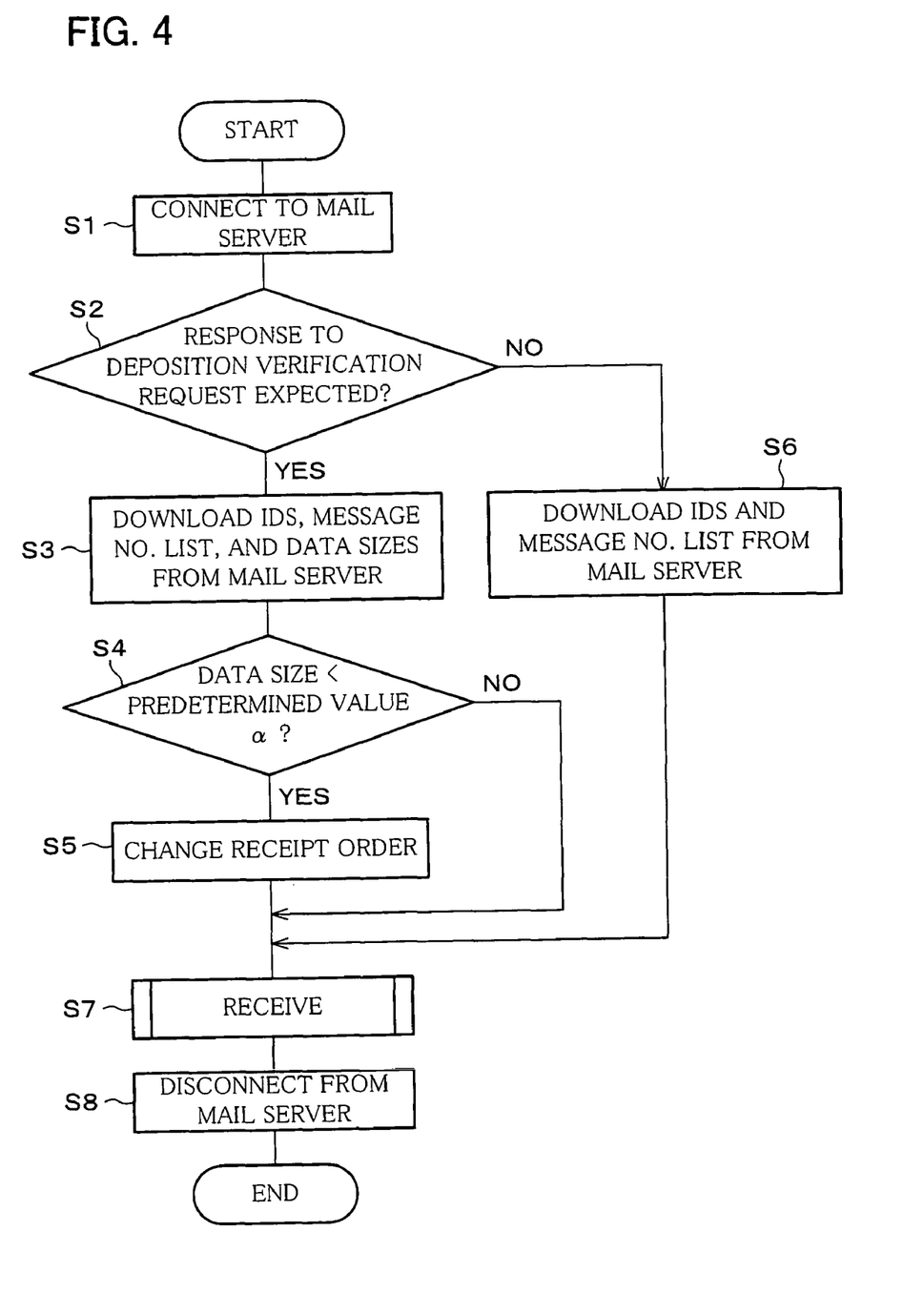
FIG. 4 is a flow chart depicting e-mail message transmission/receipt operation of the terminal machine in FIG. 1.

FIG. 4 is a flow chart depicting the receipt operation realized by the preferential reply message receipt function of the transmitting-end terminal machine 21.

As shown in the figure, in the terminal machine 21, first, the LAN control unit 11 connects the terminal machine 21 to the mail server machine 22 (S1).

Next, the disposition verification control unit 14 verifies whether a response to a disposition verification request is being expected concerning an e-mail message already transmitted from the terminal machine 21 (S2). The operation is performed according to whether the transmitted e-mail message included a disposition verification request.

If a response to a disposition verification request is expected in S2, the main control unit 2 obtains from the mail server machine 22 unique IDs and data sizes, as well as a message number list, for all the e-mail messages addressed to the terminal machine 21 (S3).

Note that IDs are strings of arbitrarily chosen 70 or less characters, assigned respectively to the e-mail messages to represent the messages' identity information. Message numbers are serial numbers starting from 1, assigned to the e-mail messages stored in the mail server machine 22 in the order that they were stored. When an e-mail message is deleted, the message numbers are reassigned to the remaining e-mail messages so that they are serially numbered.

Next, for each e-mail message addressed to the terminal machine 21, the e-mail message identifying unit 16 compares the data size obtained in step S3 with a predetermined data size α to determine whether there are any e-mail messages having a smaller data size than a (S4).

Here, a reply message to a disposition verification request is smaller in size than ordinary e-mail messages, such as Internet facsimiles. No MDN responses (reply message) include an image data attachment, and their data sizes are far smaller. Therefore, setting the data size a to, for example, 5 KB allows for the identifying of a reply message.

Next, if there is an e-mail message having a smaller data size than α, the main control unit 2 executes a process to alter the order of receipt of e-mail messages, from ascending order of the message numbers to such an order that any e-mail message having a smaller data size than a is given priority (S5).

Figure 6:
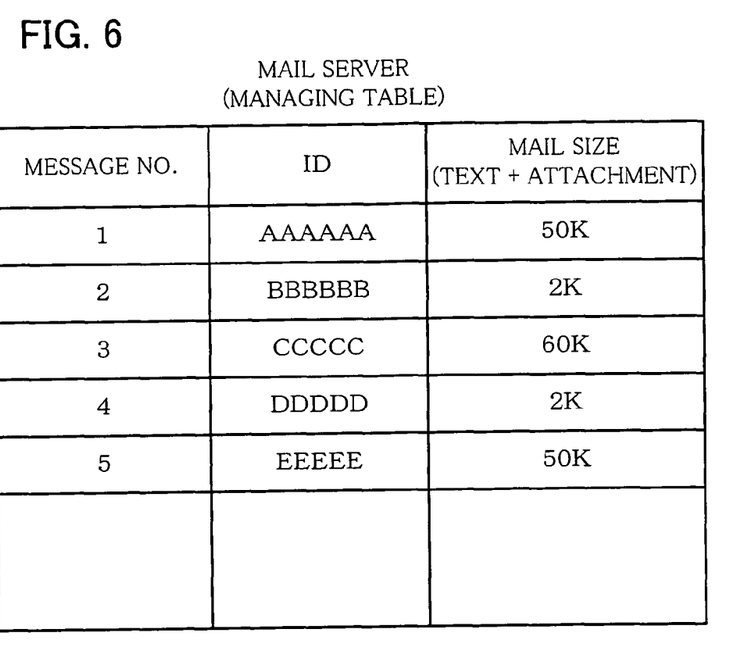
FIG. 6 is a management table showing states of e-mail messages stored in the mail server machine in FIG. 1.
Figure 7:
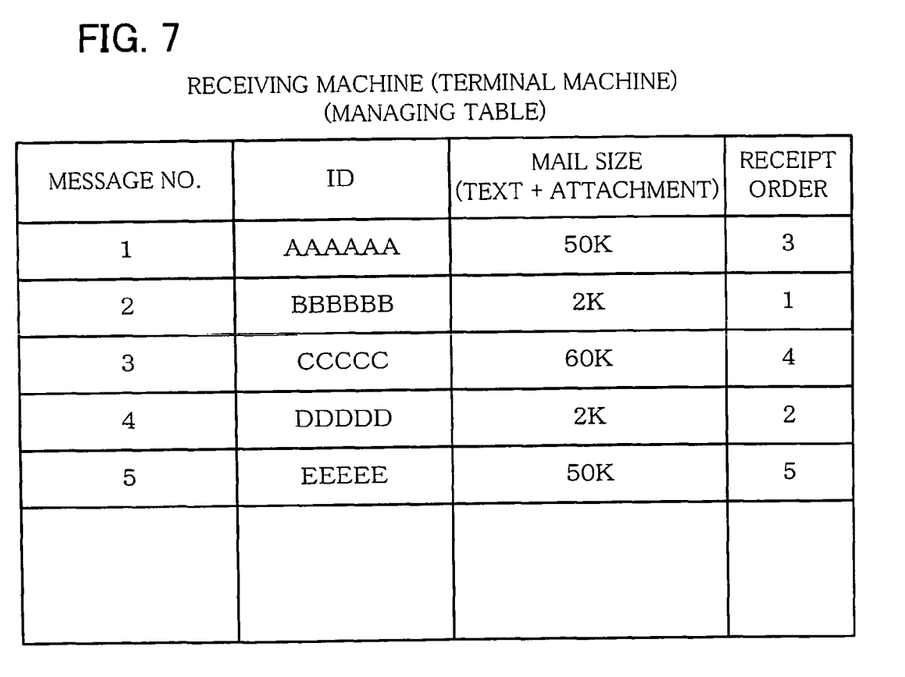
FIG. 7 is a management table showing states of e-mail messages stored in the mail server machine in FIG. 1 after the messages' receipt order is altered.

Supposing, for example, that the mail server machine 22 5 e-mail messages as shown in FIG. 6, S4 determines that the messages 2 and 4 are smaller than 5 KB. The messages having a smaller data size than 5 KB are likely to be reply messages to disposition verification requests. Accordingly, in S5, the main control unit 2 implements a process to alter the order in which the e-mail messages are received, so that priority is given to the messages numbered 2 and 4, rather than the others, in the receipt of the messages by the terminal machine 21 (makes a request to the mail server machine 22 so that the machine 22 changes the order in which it sends the e-mail messages to the terminal machine 21). Results are shown in FIG. 7.

If the receipt order has been altered in S5, the main control unit 2 receives the messages in the resultant order (S7). If no e-mail messages are found to have a smaller data size than α in S4, the operation skips the receipt order alteration process (S5) and continues at S7 where the e-mail messages are received in the order of the message numbers.

On the other hand, if no response to a disposition verification request is expected in S2, the main control unit 2 obtains unique IDs and a message number list for the e-mail messages addressed to the terminal machine 21 from the mail server machine 22 (S6). The main control unit 2 then receives the e-mail messages in the order of the message numbers (S7).

With the receipt process being completed in S7, the main control unit 2 disconnects from the mail server machine 22 (S8), ending the operation.

Now, the receipt process (S7) will be described in detail with reference to the flow chart in FIG. 5.

In the process, in the terminal machine 21, the image storage space balance managing unit 17 first detects empty space in the image storage unit 6 (S11), before receiving data size (space) information on the e-mail messages identified through the unique IDs received from the mail server machine 22 (S12). Note that if the terminal machine 21 is expecting a response to a disposition verification request in S2, the data size information was already received in S3.

The image storage space balance managing unit 17 then determines if an e-mail message has a smaller data size than the total memory capacity of the image storage unit 6 (S13). If the data sizes of the e-mail messages is smaller than the total memory capacity of the image storage unit 6, it is determined whether the e-mail message data size is smaller than the empty space in the image storage unit 6 (S14).

If the e-mail message data size is smaller than the empty space in the image storage unit 6 in S14, the e-mail message is received from the mail server machine 22 and stored in the image storage unit 6 (S15). On the other hand, if the e-mail message data size is more than or equal to the total memory capacity of the image storage unit 6 in S13 or if the e-mail message data size is more than or equal to the empty space in the image storage unit 6 in S14, the e-mail message is not received from the mail server machine 22 (S16).

Thereafter, the process of S11-S16 is repeated until the process is completed for each e-mail message stored in the mail server machine 22 and addressed to the terminal machine 21 when the receipt process is ended (S17).

As mentioned previously, the transmitting-end terminal machine (facsimile/e-mail message machine) 21 first connects to the mail server machine 22 and transmits to a destination (receiving-end terminal machine 25) an e-mail message to which a disposition verification response request has been added. Thereafter, when the terminal machine 21 connects again to the mail server machine 22 to receive the e-mail messages stored in the mail server machine 22, the e-mail message identifying unit 16 distinguishes between an e-mail response message to a disposition verification request and the other, ordinary e-mail messages. The e-mail response message is given priority in receipt by the alteration of the order in which the e-mail messages are received.

Thus, the transmitting-end terminal machine 21 is able to quickly receive a disposition-verification reply message. Further, an timeout error (reply message receipt failure) can be prevented from occurring which is due to an e-mail message (data) having an excessively large size being downloaded when the machine 21 is logging onto the mail server machine 22.

In addition, by virtue of the S14 and S16 operations, a reply message receipt failure can be prevented from occurring which is due to an e-mail message having a large size being downloaded before the reply message and leaving insufficient empty space in the memory.

Embodiment 2

The following will describe another embodiment of the present invention in reference to drawings.

Here, reference will be made to the flow charts in FIGS. 8, 9 to illustrate a function of the transmitting-end terminal machine 21 whereby it manages the empty space in the image storage unit 6 which stores the data received from the mail server machine 22 to preferentially receive the reply message.

Figure 8:
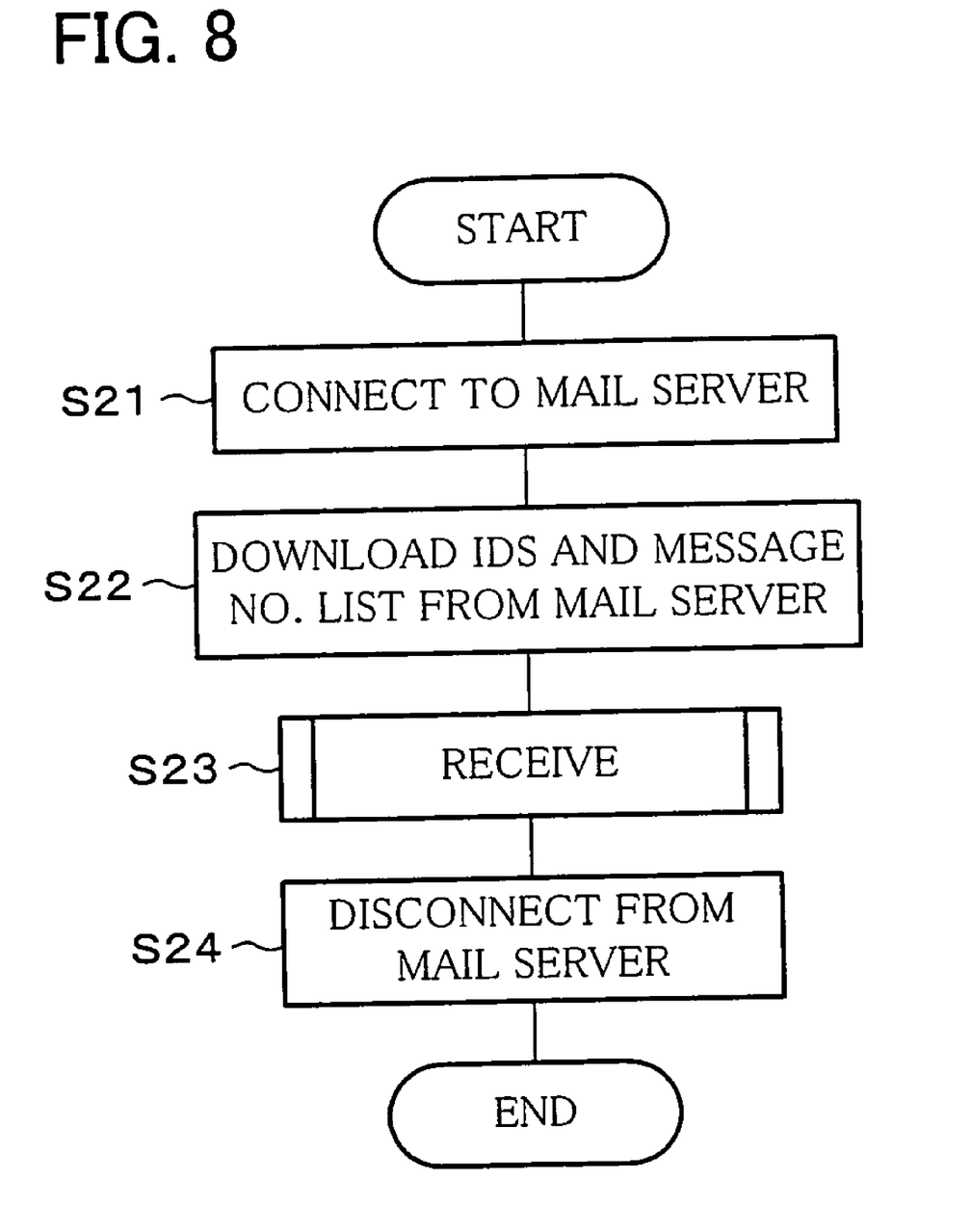
FIG. 8 is a flow chart depicting e-mail message transmission/receipt operation of the terminal machine in accordance with another embodiment of the present invention.

Referring to FIG. 8, the transmitting-end terminal machine (facsimile/e-mail message machine) 21 first connects to the mail server machine 22 (S21), and receives unique IDs and a message number list for the e-mail messages stored in the mail server machine 22 (S22).

Next, the terminal machine 21 performs a predetermined receipt process in accordance with the relationship between the data sizes of the e-mail messages identified by the unique IDs and the empty space in the image storage unit 6 (S23), and stores those received e-mail messages in the image storage unit 6.

Then, when the receipt process S23 ends, the terminal machine 21 disconnects from the mail server machine 22 to end the operation (S24).

Next, the receipt process S23 will be described in detail in reference to FIG. 9.

The transmitting-end terminal machine 21 has transmitted an e-mail message to the receiving-end terminal machine 25 and is in a condition of waiting for a response to the disposition verification request. It is the disposition verification control unit 14 that verifies that there is any response expected in return for a disposition verification request. The verification process is implemented based on whether a disposition verification request has been made in the transmitted e-mail message.

Figure 5:
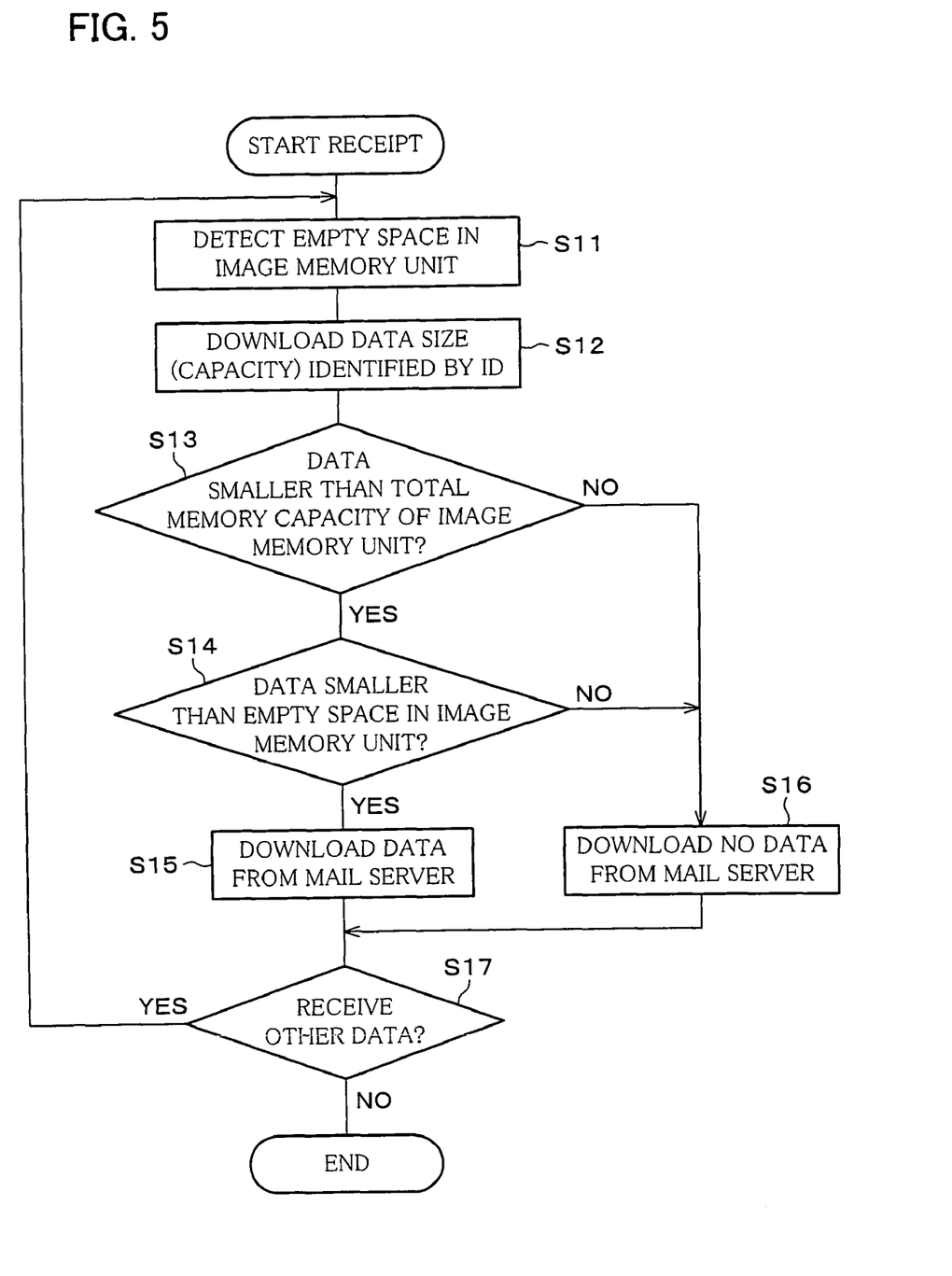
FIG. 5 is a flow chart depicting the receipt step S7 in FIG. 4.
Figure 9:
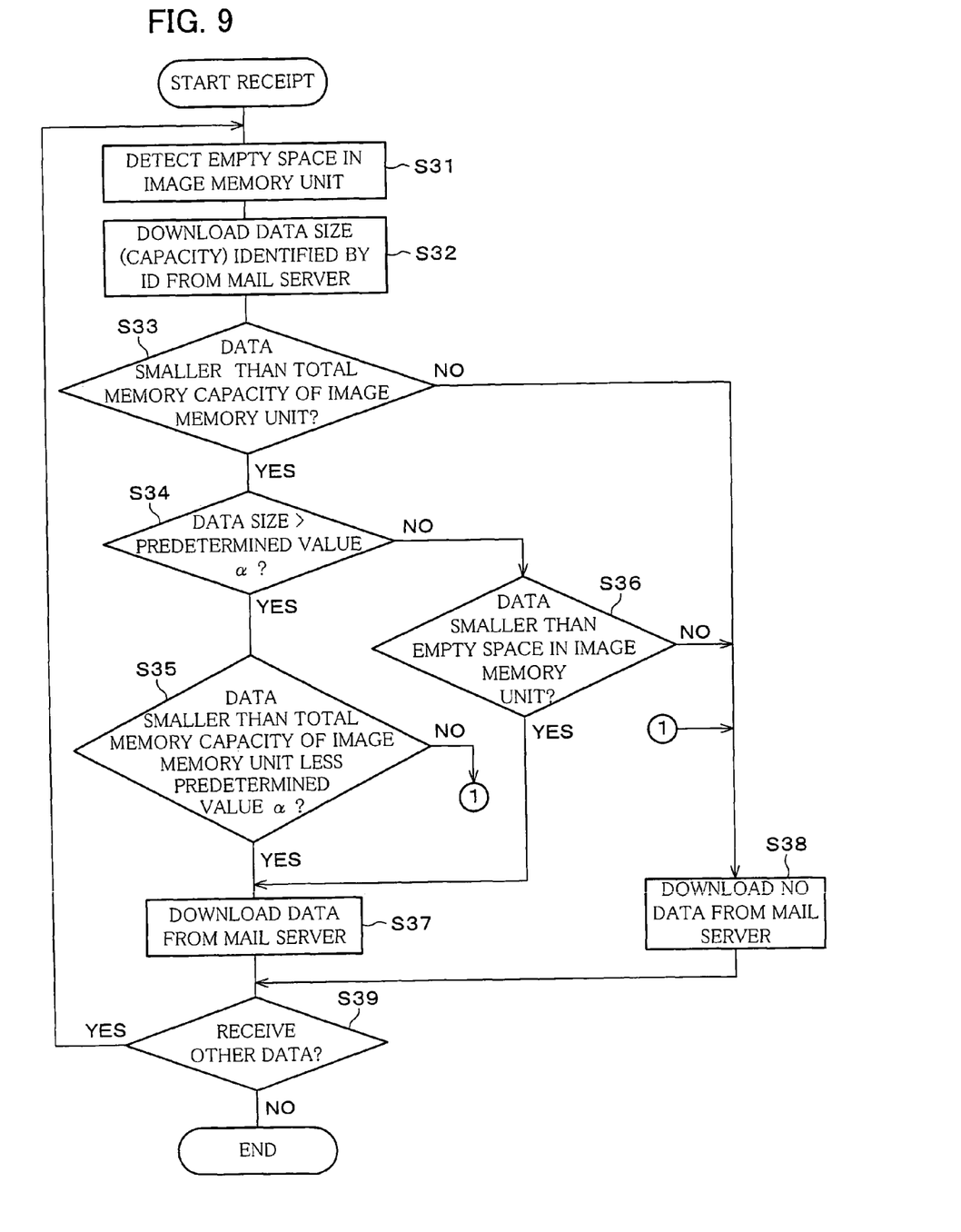
FIG. 9 is a flow chart depicting the receipt step S23 in FIG. 8.

If a response to a disposition verification request is being expected, the terminal machine 21 starts a receipt process at S31 and onwards in FIG. 9; if no response to a disposition verification request is being expected, the terminal machine 21 starts a receipt process at S11 and onwards in FIG. 5.

In the operation shown in FIG. 9, in the terminal machine 21, the image storage space balance managing unit 17 first detects the empty space in the image storage unit 6 (S31), and receives data size (space) information for an e-mail message identified by a previously obtained unique IDs (S32).

Next, the image storage space balance managing unit 17 determines whether the data size of the e-mail message is smaller than the total memory capacity of the image storage unit 6 (S33).

If the result of the determination shows that the data size of the e-mail message is smaller than the total memory capacity of the image storage unit 6, it is determined whether the data size of the e-mail message is larger than a predetermined value $\alpha$ (S34). Here, similarly to the foregoing, setting, the predetermined value $\alpha$ to, for example, 5 KB, enables the determination on the reply message.

If the result of the determination in S34 shows that the data size of the e-mail message is larger than the predetermined value $\alpha$, that is, the e-mail message is not a reply message, it is determined whether the data size of the e-mail message is smaller than the empty space in the image storage unit 6 less the predetermined value $\alpha$ (S35).

If the result of the determination shows that the data size of the e-mail message is smaller than the empty space in the image storage unit 6 less the predetermined value $\alpha$, the e-mail message is received from the mail server machine 22 and stored in the image storage unit 6 (S37).

If, in S35, the data size of the e-mail message is more than or equal to the empty space in the image storage unit 6 less the predetermined value $\alpha$, the operation proceeds to S38, whereby the e-mail message is not received from the mail server machine 22.

If, in S34, the data size of the e-mail message is less than or equal to the predetermined value $\alpha$, that is, it is likely that the e-mail message is a reply message, it is determined whether the data size of the e-mail message is smaller than the empty space in the image storage unit 6 (S36).

If the result of the determination in S36 shows that the data size of the e-mail message is smaller than the empty space in the image storage unit 6, the e-mail message is received from the mail server machine 22 and stored in the image storage unit 6 (S37).

If the result of the determination in S36 shows that the data size of the e-mail message is larger than the empty space in the image storage unit 6, the operation proceeds to S38, where the e-mail message is not received from the mail server machine 22, since the e-mail message cannot be stored in the image storage unit 6.

If, in S33, the data size of the e-mail message is more than or equal to the total memory capacity of the image storage unit 6, the operation proceeds similarly to S38 whereby the e-mail message is not received from the mail server machine 22.

Thereafter, the process of S31-S38 is repeated until the process is completed for each e-mail message stored in the mail server machine 22 and addressed to the terminal machine 21 when the receipt process is ended (S39).

As mentioned previously, the transmitting-end terminal machine (facsimile/e-mail message machine) 21 first connects to the mail server machine 22 and transmits to a destination (receiving-end terminal machine 25) an e-mail message to which a disposition verification response request has been added. Thereafter, when the terminal machine 21 connects to the again mail server machine 22 to receive the e-mail message stored in the mail server machine 22, the size of the incoming e-mail message is compared with the empty space in the image storage unit 6 to secure empty space required to receive an e-mail response message to verify a disposition. The e-mail response message is thus reliably received.

Further explaining the predetermined value a, there is no output for an attachment ("(c) ATTACHMENT" in FIG. 3) to a MDN reply message; therefore, securing empty space indicated by the predetermined value α in the first place makes it possible to continuously implement a process on the e-mail messages already received and another process on a next incoming message. For convenience in data processing, the predetermined value α may be α×A where A is the number of responses to disposition verification requests which are currently expected.

At last, the blocks of the terminal machines 21, 25 may be realized by way of hardware or software as executed by a CPU as follows:

The terminal machines (communications devices) 21, 25 are each equipped with a CPU (central processing unit) executing instructions in a control program realizing the functions and storage devices (recording media), such as a ROM (read only memory) recording the program, a RAM (random access memory) loading the program, a memory to record the program and various data. The objective of the present invention can also be achieved by feeding into the terminal machines 21, 25 a computer-readable recording medium on which is stored the code (executable program, intermediate code program, source program) of a program controlling the terminal machines 21, 25, which is software realizing the aforementioned functions, in order for the computer (or CPU, MPU) to read and execute the program code stored on the recording medium.

The recording medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as mask ROM/EPROM/EEPROM/flash ROM.

The terminal machines 21, 25 may be arranged to be connectable to a communications network so that the program code may be delivered over the communications network. The communications network is not limited in any particular manner, and may be, for example, the Internet, intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal in which the program code is embodied electronically.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A communications device transmitting/receiving data over a network and making a request for a response to a data transmission from a receiving-end machine, said device comprising:
    data identifying means for determining whether data to be received over the network is response data to the response request by comparing a size of the data to be received to a predetermined data size; and
    receipt control means for controlling receipt so as to preferentially receive data identified as the response data by the data identifying means over other data,
    the data being transmitted/received through a relay device that assigns a serial number to each set of data, and
    the receipt control means receiving the data in accordance with a ranking indicated by the serial numbers, and when the response data is to be received from the relay device, changes the ranking by way of a request to the relay device from the ranking indicated by the serial numbers,
    the communications device further comprising:
    storage means for storing received data; and
    storage control means for controlling storing to the storage means so that after storing the received data, the storage means is left with empty space needed to store the response data, the response data being ranked higher than other data.

2. A tangible computer-readable recording medium on which is recorded a program for causing a computer to operate, when a request for a response to a data transmission from a receiving-end machine is embedded in transmitted data, as:
    data identifying means for determining whether data to be received over a network is response data to the response request by comparing a size of the data to be received to a predetermined data size; and
    receipt control means for controlling receipt so as to preferentially receive data identified as the response data by the data identifying means over other data,
    the data being transmitted/received through a relay device that assigns a serial number to each set of data, and the receipt control means receiving the data in accordance with a ranking indicated by the serial numbers, and when the response data is to be received from the relay device, changes the ranking by way of a request to the relay device from the ranking indicated by the serial numbers,
    the communications device further comprising:
    storage means for storing received data; and
    storage control means for controlling storing to the storage means so that after storing the received data, the storage means is left with empty space needed to store the response data, the response data being ranked higher than other data.

3. A communications device, comprising:
    transmission/receipt means for transmitting/receiving data over a network;
    response request embedding means for embedding a response request for a response to a data transmission from a receiving-end machine in transmitted data;
    data identifying means for determining whether data to be received over the network is response data to the response request by comparing a size of the data to be received to a predetermined data size; and
    receipt control means for controlling the transmission/receipt means so as to preferentially receive data identified as the response data by the data identifying means over other data,
    the data being transmitted/received through a relay device that assigns a serial number to each set of data, and
    the receipt control means receiving the data in accordance with a ranking indicated by the serial numbers, and when the response data is to be received from the relay device, changes the ranking by way of a request to the relay device from the ranking indicated by the serial numbers,
    the communications device further comprising:
    storage means for storing received data; and
    storage control means for controlling storing to the storage means so that after storing the received data, the storage means is left with empty space needed to store the response data, the response data being ranked higher than other data.

4. A tangible computer-readable recording medium on which is recorded a program for causing a computer to operate as:
- transmission/receipt means for transmitting/receiving data over a network;
- response request embedding means for embedding a response request for a response to a data transmission from a receiving-end machine in transmitted data;
- data identifying means for determining whether data to be received over the network is response data to the response request by comparing a size of the data to be received to a predetermined data size; and
- receipt control means for controlling the transmission/receipt means so as to preferentially receive data identified as the response data by the data identifying means over other data,
- the data being transmitted/received through a relay device that assigns a serial number to each set of data, and
- the receipt control means receiving the data in accordance with a ranking indicated by the serial numbers, and when the response data is to be received from the relay device, changes the ranking by way of a request to the relay device from the ranking indicated by the serial numbers,
- the communications device further comprising:
- storage means for storing received data; and
- storage control means for controlling storing to the storage means so that after storing the received data, the storage means is left with empty space needed to store the response data, the response data being ranked higher than other data.

5. A communications device transmitting/receiving data over a network and making a request for a response to a data transmission from a receiving-end machine, said device comprising:
- data identifying means for determining whether data to be received over the network is response data to the response request; and
- receipt control means for ranking, concerning receiving of data, data identified as the response data by the data identifying means higher than other data,
- the data being transmitted/received through a relay device that assigns a serial number to each set of data, and
- the receipt control means receiving the data in accordance with a ranking indicated by the serial numbers, and when the response data is to be received from the relay device, changes the ranking by way of a request to the relay device from the ranking indicated by the serial numbers,
- the communications device further comprising:
- storage means for storing received data; and
- storage control means for controlling storing to the storage means so that after storing the received data, the storage means is left with empty space needed to store the response data, the response data being ranked higher than other data.

6. A communications method of transmitting/receiving data over a network and making a request for a response to a data transmission from a receiving-end machine, said method comprising the steps of:
- determining whether data to be received over the network is response data to the response request by comparing a size of the data to be received to a predetermined data size; and
- preferentially receiving data identified as the response data over other data,
- the data being transmitted/received through a relay device that assigns a serial number to each set of data, and
- the data being received in accordance with a ranking indicated by the serial numbers, and when the response data is to be received from the relay device, changes the ranking by way of a request to the relay device from the ranking indicated by the serial numbers,
- the method further comprising steps of:
- storing received data in a storage means; and
- controlling storing to the storage means so that after storing the received data, the storage means is left with empty space needed to store the response data, the response data being ranked higher than other data.

7. A communications device transmitting/receiving data over a network and making a request for a response to a data transmission from a receiving-end machine, said device comprising:
- data identifying means for determining whether data to be received over the network is response data to the response request; and
- receipt control means for ranking, concerning receiving of data, data identified as the response data by the data identifying means higher than other data, wherein:
- the data is transmitted/received through a relay device receiving and storing the data addressed to the communications device over the network;
- the relay device assigns identity information and a serial number to each of stored data sets, the serial numbers being assigned in an order that the data sets are stored, the stored data sets being renumbered where necessary so that they are serially numbered; and
- the receipt control means receives the data from the relay device in accordance with a ranking indicated by the serial numbers and, when the response data is to be received from the relay device, changes the ranking by way of a request to the relay device from the ranking indicated by the serial numbers,
- the communications device further comprising:
- storage means for storing received data; and
- storage control means for controlling storing to the storage means so that after storing the received data, the storage means is left with empty space needed to store the response data, wherein:
- the data identifying means determines whether the data to be received from the relay device over the network is the response data by comparing a size of the data to be received to a predetermined data size;
- when the data identifying means has determined that the data to be received from the relay device is not the response data, the storage control means determines whether the size of the data to be received is smaller than the empty space in the storage means less a predetermined value $\alpha \times A$, where A is a number of the response requested; and
- when the storage control means has determined that the size of the data to be received from the relay device is greater than or equal to the empty space in the storage means less the predetermined value $\alpha \times A$, the receipt control means does not receive the data from the relay device.

* * * * *